(12) United States Patent
Kugo

(10) Patent No.: US 7,463,784 B2
(45) Date of Patent: Dec. 9, 2008

(54) IMAGE PROCESSING METHOD AND APPARATUS FOR IMAGE SHARPENING

(75) Inventor: Koichi Kugo, Wakayama (JP)

(73) Assignee: Noritsu Koki Co., Ltd., Wakayama-ken (JP)

( * ) Notice: Subject to any disclaimer, the term of this patent is extended or adjusted under 35 U.S.C. 154(b) by 733 days.

(21) Appl. No.: 10/982,446

(22) Filed: Nov. 5, 2004

(65) Prior Publication Data

US 2005/0123213 A1    Jun. 9, 2005

(30) Foreign Application Priority Data

Nov. 6, 2003    (JP) ............................. 2003-376968

(51) Int. Cl.
*G06K 9/40*    (2006.01)
*H04N 1/407*    (2006.01)

(52) U.S. Cl. ..................... 382/263; 358/3.27

(58) Field of Classification Search ................. 382/162, 382/190, 261, 263, 268, 274, 254; 358/445, 358/3.27
See application file for complete search history.

(56) References Cited

U.S. PATENT DOCUMENTS

| | | | | |
|---|---|---|---|---|
| 5,031,227 A * | 7/1991 | Raasch et al. | ................ | 382/199 |
| 5,363,209 A * | 11/1994 | Eschbach et al. | ............ | 358/445 |
| 5,822,467 A * | 10/1998 | Lopez et al. | ................. | 382/261 |
| 5,854,859 A * | 12/1998 | Sobol | .......................... | 382/261 |
| 6,057,935 A * | 5/2000 | Freeman | ..................... | 358/1.9 |
| 6,614,944 B1 * | 9/2003 | Levantovsky | ............... | 382/261 |
| 6,915,024 B1 * | 7/2005 | Maurer | ........................ | 382/274 |
| 7,155,067 B2 * | 12/2006 | Jayant et al. | ................ | 382/268 |

| | | |
|---|---|---|
| 2001/0022622 A1 | 9/2001 | Eiho et al. |
| 2002/0110282 A1 | 8/2002 | Kraft et al. |
| 2003/0108245 A1 | 6/2003 | Gallagher et al. |
| 2003/0161544 A1 | 8/2003 | Gallagher et al. |

FOREIGN PATENT DOCUMENTS

| | | |
|---|---|---|
| EP | 1 209 621 A | 5/2002 |
| JP | 2000-278532 | 10/2000 |
| JP | 2003-101784 | 4/2003 |

OTHER PUBLICATIONS

B. D. Zarit et al., "comparison of five color models in skin pixel classification," Recognition, Analysis, and Tracking of Faces and Gestures in Real-Time Systems, 1999. Proceedings. International Workshop of Corfu, Greece Sep. 26-27, 1999, Los Alamitos, CA, USA, IEEE Comput. Soc. US, Sep. 26, 1999, pp. 58-63, XP010356437, ISBN: 0-7695-0378-0, p. 58-p. 59.

A. Polesel et al., "Image enhancement via adaptive unsharp masking", IEEE Transactions on Image Processing, IEEE Inc. New York,K US, vol. 9, No. 3, pp. 505-510, XP006556774, ISSN: 1057-7149, whole document, Mar. 2000.

* cited by examiner

*Primary Examiner*—Kanji Patel
(74) *Attorney, Agent, or Firm*—Fulbright & Jaworski LLP (57) ABSTRACT

An image processing apparatus for sharpening photographic image data obtained through digitization of a photographic image by using a sharpening filter capable of sharpening intensity adjustment. The apparatus includes a parameter determining section for extracting from the photographic image data a predetermined color pixel showing a predetermined color and then giving a sharpening intensity adjustment parameter to the predetermined color pixel and a sharpening operation section for effecting a pixel-by-pixel sharpening operation on the photographic image data while adjusting a sharpening intensity of the sharpening filter according to the sharpening intensity adjustment parameter.

10 Claims, 8 Drawing Sheets

IMAGE PROCESSING METHOD AND APPARATUS FOR IMAGE SHARPENING

BACKGROUND OF THE INVENTION

1. Field of the Invention

The present invention relates to an image processing method and apparatus for sharpening (edge sharpening) photographic image data obtained by digitizing, by using a film scanner, a photographic image formed on a photographic film or photographic image data obtained by directly digitizing a photographic image by a digital photographic device such as a digital camera. The method effects the sharpening by utilizing a sharpening filter technique capable of sharpening intensity adjustment. The invention relates also to a computer-executable program for implementing the method as well as an apparatus for implementing the method.

2. Description of the Related Art

As is known, in a system for effecting an image processing on photographic image data inputted thereto and outputting the processed image through a photographic printer, sharpness deterioration occurs in its output image. Therefore, the system effects an image sharpening operation on the inputted photographic image data by using a Laplacian filter or unsharpening mask. However, while such image sharpening operation, if effected, indeed improves the (edge) sharpness of the photographic image, this operation also results in undesired enhancement of noise components included in the photographic image, thus inviting image quality deterioration. Especially, such noise enhancement effect resulting from the image sharpening operation will manifest itself more conspicuously in an image area such as of sky, human skin, etc. which extends uniformly without fine line patterns.

One conventional solution to this problem is known from e.g. Japanese Patent Application "Kokai" No. 2000-278532 (Document 1) (paragraphs [0007] through [0008], FIG. 1). An image processing apparatus disclosed in this document includes a line image detecting means for determining whether a predetermined pixel in inputted photographic image data constitutes a line image or not and a sharpening means for effecting a sharpening operation only on image data corresponding to the line image, based on the detection by the line image detecting means, so that only such image data corresponding to the line image may be enhanced. With this, even when e.g. unnecessary data such as those relating to film grains, noise, etc. are present over the entire photographic image data, undesired enhancement of the unnecessary data in the whole image can be avoided. As a result, there is obtained an image with appropriate sharpening without visible roughness in the sharpened image. Yet, even with this image sharpening technique, noise can be erroneously detected as a line image in the case of image data having significant noise amplitude variation, such as image data based on a photographic image of defective exposure. Hence, as such pixels also are subjected to the sharpening operation, the noise will be enhanced in the outputted photographic image.

Another solution is known from e.g. Japanese Patent Application "Kokai" No. 2003-101784 (paragraphs [0006] through [0007], FIG. 1). According to this document, an image processing apparatus capable of effecting a sharpening operation on image data operates as follows. First, the apparatus calculates, from the inputted image data, a local standard deviation indicative of pixel value variation within a predetermined area and then normalizes this local standard deviation, thereby to obtain an index value indicative of a degree of pixel value variation. Then, the apparatus calculates a sharpness enhancement coefficient indicative of intensity of sharpness enhancement, whose value monotonously varies in association with increase in the index value, so that the apparatus effects the sharpening operation on the image data by using the sharpness enhancement coefficient. In the case of this image sharpening technique, in an attempt to solve the above-described problem, the sharpening operation is effected selectively in such a manner that photographic image data based on a subject with less conspicuous noise component is subjected to a sufficient and necessary degree of sharpness enhancement whereas photographic image based on a subject with conspicuous noise component is subjected to a lesser degree of sharpness enhancement. This technique employs a statistical approach for entire image. Hence, while the technique can achieve a certain average or overall effect, the technique can hardly achieve any significant image quality improvement within a specified area in the image, such as an area of human skin, sky, etc. which area has greater visual importance in the photography.

SUMMARY OF THE INVENTION

In view of the above-described state of the art, a primary object of the present invention is to avoid undesired noise enhancement, during a sharpening operation on a photographic image, in a photographically important area thereof such as an area of human skin, sky, etc.

For fulfilling the above-noted object, according to one aspect of the present invention, there is proposed an image processing method for sharpening photographic image data obtained through digitization of a photographic image by using a sharpening filter capable of sharpening intensity adjustment, the method comprising the steps of:

extracting from the photographic image data a predetermined color pixel showing a predetermined color;

giving a sharpening intensity adjustment parameter to the predetermined color pixel; and effecting a pixel-by-pixel sharpening operation on the photographic image data while adjusting a sharpening intensity of the sharpening filter according to the sharpening intensity adjustment parameter.

With the above-described image processing method, a color of photographic importance such as sky color, human skin color, etc. is predetermined. Then, a predetermined color pixel showing such predetermined color is extracted from photographic image data; then, a predetermined sharpening intensity adjustment parameter is given to this predetermined color pixel. Subsequently, in effecting the sharpening operation on the photographic image data, the sharpening intensity of the sharpening filter is adjusted. More particularly, the sharpening intensity for this pixel is lessened, compared with the other area. As a result, the undesired noise enhancement resulting from the sharpening operation can be avoided in the photographically important area of sky, human skin, etc. in the photographic image.

The image processing method for image sharpening can be realized in the form of software and/or hardware. According to one preferred proposed mode of embodiment thereof, the sharpening filter comprises a Laplacian filter whose output is adjusted according to the sharpening intensity adjustment parameter, and a value of the adjusted output is subtracted from a pixel value of the predetermined color pixel. This sharpening technique can be realized by simply adding the function of adjusting an output value from the Laplacian filter according to the sharpening intensity adjustment parameter to the well-known Laplacian type image sharpening filter operable to subtract its output from an original image. Hence, this construction is advantageous for limited costs for its development.

As the preparatory step for the subsequent sharpening operation, it is necessary to give and store in advance, the predetermined sharpening intensity adjustment parameter to the extracted predetermined color pixel. Therefore, for the sake of simplicity of the processing program, it is preferred that the sharpening intensity adjustment parameter be tabulated in the form of a lookup table in correlation with the position of the pixel as an address.

Needless to say, the "predetermined color" as defined herein for use in the sharpening intensity adjustment is not limited to any single color value, but is specified within a predetermined color value range. In this regard, while it may be possible to give a same sharpening intensity adjustment parameter to all "predetermined color pixels" belonging within such color value range, it may be preferred in some cases to vary the parameter according to the color values thereof. For this reason, according to another preferred embodiment of the invention, the sharpening intensity adjustment parameter is determined, depending on a color space distance from a reference color representing the predetermined color. The "color space distance" as used herein refers to a "distance" from the reference color in the respect of hue, chroma, or luminance, or any combination thereof. Such sharpening intensity adjustment parameter dependent on the color space distance can be obtained empirically and/or experimentally.

If the invention's method or apparatus is used for outputting photographic prints, then, it is preferred that the predetermined color be a human skin color and the sky color, in consideration of the generally observed consumers' (customers to a photo service shop for photographic prints output) desire to obtain photo prints of beautifully developed skin color and sky color, it is preferred that the predetermined color comprise the human skin color and the sky color. Conditions for determining predetermined color for use in the extraction of pixels relating to such human skin and sky colors can be obtained empirically, experimentally and also statistically. One example thereof will be described next.

First, photographic image data expressed in the RGB color space are converted into the YCC space according to the following formula.

$$\begin{bmatrix} Y \\ C_1 \\ C_2 \end{bmatrix} = \begin{bmatrix} 0.333 & 0.333 & 0.334 \\ -0.166 & 0.50 & -0.334 \\ 0.50 & -0.334 & -0.166 \end{bmatrix} \begin{bmatrix} R \\ G \\ B \end{bmatrix} \quad \text{[formula 4]}$$

Where, the determination condition for the human skin color in this YCC space is:

$$C_1^2 + (C_2 - 25)^2 < 15^2 \quad \text{[formula 5]}$$

and the determination condition for the sky color is:

$$C_1^2 + (C_2 + 15)^2 < 15^2 \quad \text{[formula 6]}$$

The present invention relates also a computer-executable program for causing a computer to implement the above-described image processing method for image sharpening as well as to a medium storing such program therein.

According to a further aspect of the present invention, there is proposed an image processing apparatus for implementing the image. processing method, the apparatus comprising:

a parameter determining section for extracting from the photographic image data a predetermined color pixel showing a predetermined color and then giving a sharpening intensity adjustment parameter to the predetermined color pixel; and a sharpening operation section for effecting a pixel-by-pixel sharpening operation on the photographic image data while adjusting a sharpening intensity of the sharpening filter according to the sharpening intensity adjustment parameter.

Obviously, this image processing apparatus too is capable of achieving the advantageous function/effect described hereinbefore in connection with the invention's image processing method. In particular, in order to realize the sharpening operation section without involving significant modifications in the known construction, it is proposed that this sharpening operation section include a Laplacian filter for effecting a Laplacian operation on the photographic image data, a sharpening intensity adjusting section for adjusting an output value of the Laplacian filter according to the sharpening intensity adjustment parameter, and a subtracting section for subtracting a value of the adjusted output from a pixel value of the predetermined color pixel.

Further and other features and advantages of the invention will become apparent upon reading the following detailed disclosure of preferred embodiments thereof with reference to the accompanying drawings.

DESCRIPTION OF THE PREFERRED EMBODIMENTS

Preferred embodiments of the present invention will be described in details with reference to the accompanying drawings.

Figure 1:
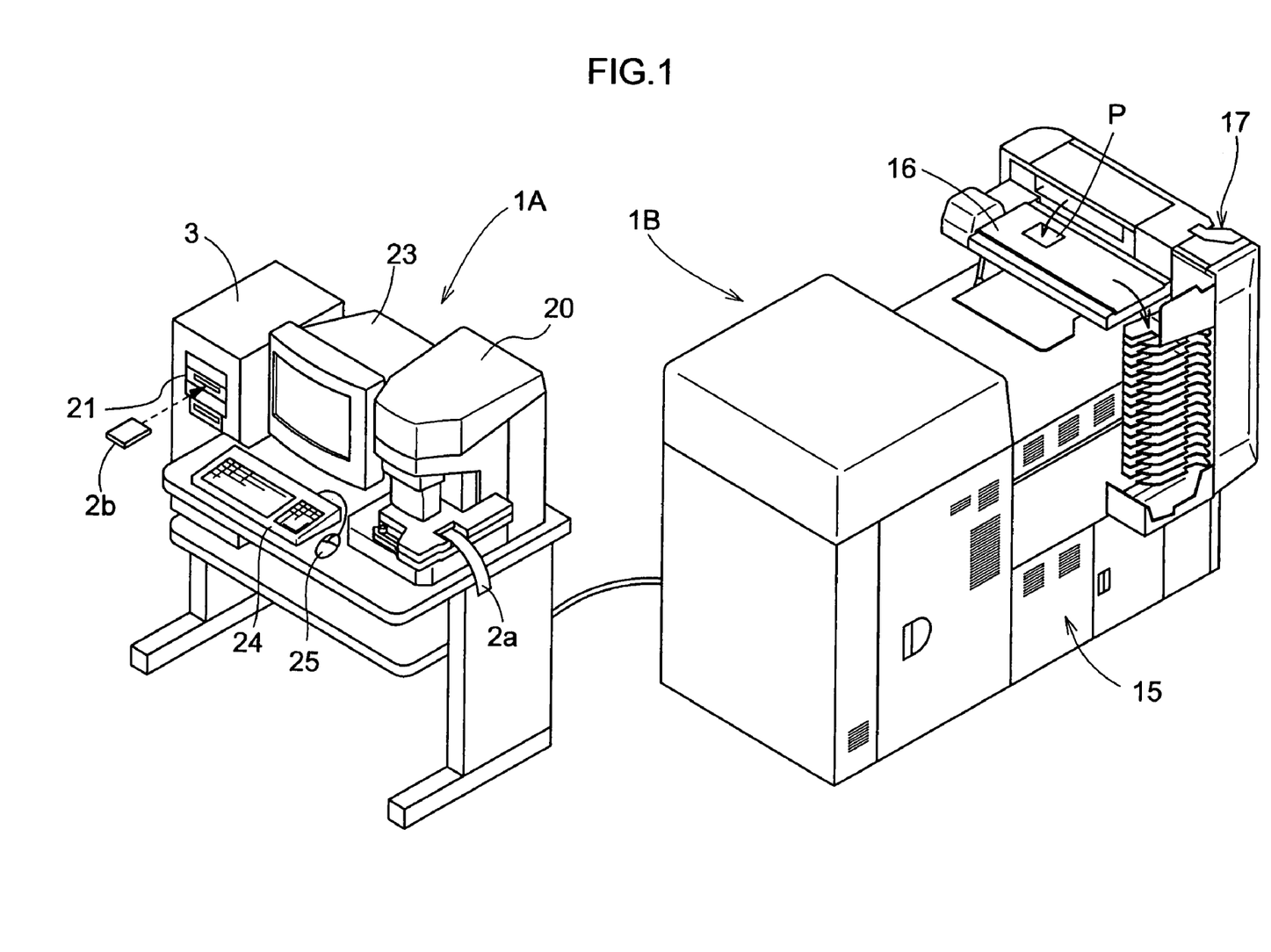
FIG. 1 is a view showing an outer appearance of a photographic printing system employing the image sharpening technique according to the present invention.

FIG. 1 shows an outer appearance of a photographic printing system employing the image sharpening technique of the present invention. As shown, this printing system consists mainly of a printing station 1B as a photographic printer for effecting exposure and development on a print paper P and an operating station 1A for processing photographic images taken from a developed photographic film 2a or various image input media such as a memory card 2b for a digital camera and effecting production/transmission of print data to be used in the printing station 1B.

This photographic printing system is known also as "digital mini-labo". As best understood from FIG. 2, in the printing station 1B, a print paper P stored in the form of a roll in either one of two print paper magazines 11 is drawn out and cut by a sheet cutter 12 to a print size strip. On this print paper P (or print size strip), a back printing unit 13 prints on its back face, color correction information and various print processing information such as a frame number, and a print exposing unit 14 exposes a front face of each paper P with a photographically recorded image. Then, a plurality of such exposed print papers P are fed into a developing tank unit 15 having a plurality of developing solution tanks for their development. After being dried, the developed print papers P are conveyed by a transverse conveyer 16 to a sorter 17, by which the papers P are sorted according to each customer's order and stacked in a plurality of trays (see FIG. 1).

Figure 2:
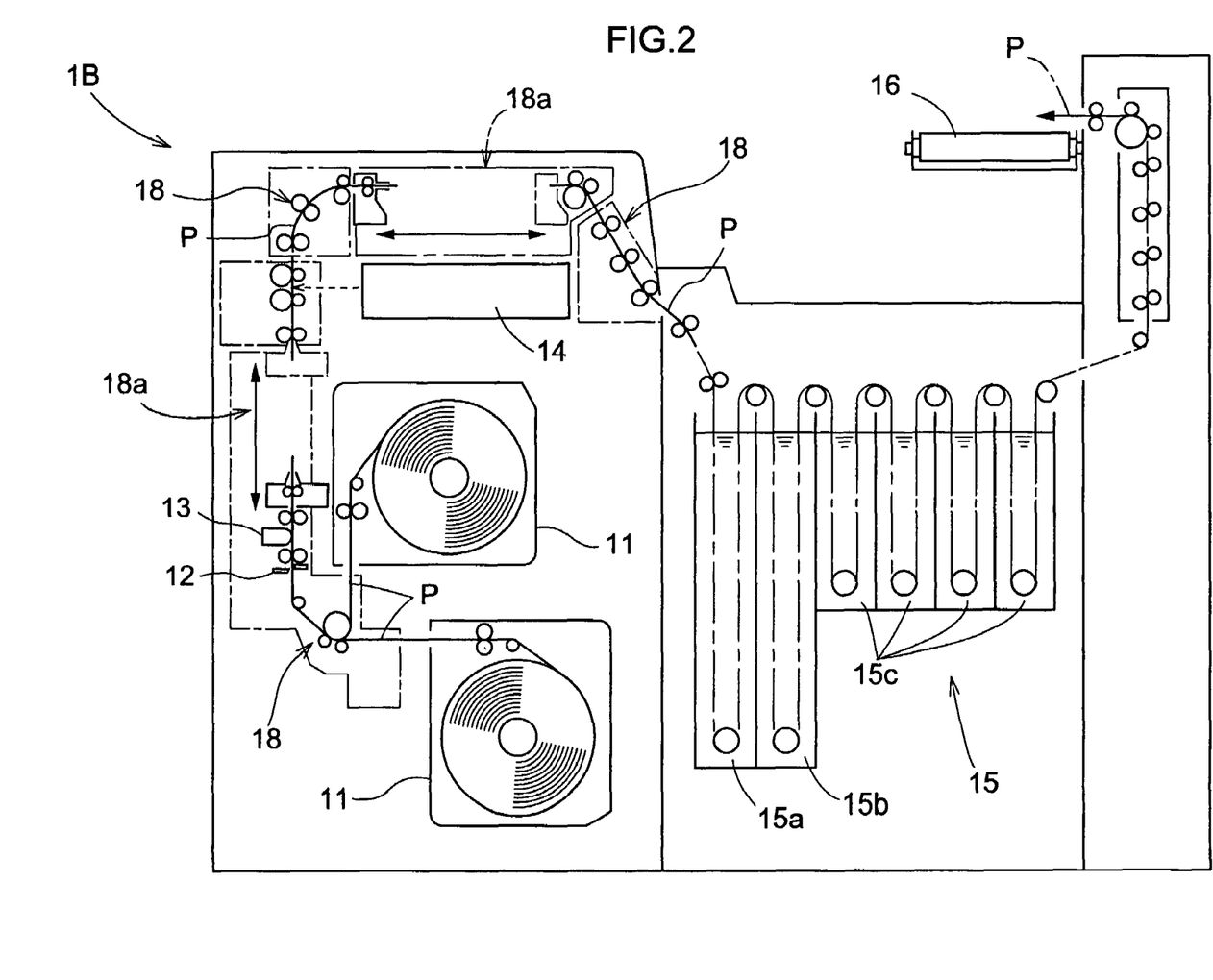
FIG. 2 is a diagram schematically showing a construction of a print station of the photographic printing system.

For transporting the print papers P at a speed adapted or suited for each of the above-described various operations, there is provided a print paper transporting mechanism 18. This print paper transporting mechanism 18 has a plurality of pinch transport roller pairs including chucker type print paper transport units 18a disposed before and after the print exposing unit 14 relative to the print paper transporting direction.

The print exposing unit 14 has line exposure heads for effecting irradiation of laser beams of three primary colors, R (red), G (green) and B (blue) along a main scanning direction of the print paper P which is being transported in a sub scanning direction, based on the print data sent from the operating station 1A. The developing solution tank unit 15 includes a color developing solution tank 15a which stores therein color developing solution, a bleaching/fixing solution tank 15b which stores therein bleaching/fixing solution and stabilizing solution tanks 15c which store stabilizing solutions therein.

At an upper position of a desk-like console of the operating station 1A, there is disposed a film scanner 20 for obtaining photographic image data ("image data" hereinafter) from the respective photographically exposed frames of the photographic film 2a. Whereas, a media reader 21 for obtaining image data from various types of semiconductor memories, CD-R or the like is incorporated within a general-purpose personal computer which functions as a controller 3 for this photographic printing system. The general-purpose PC is connected also to a monitor 23 for displaying various kinds of information and a keyboard 24 and a mouse 25 which function as operation input devices (pointing devices) employed as an instruction inputting section when various settings or adjustments are to be effected.

Figure 3:
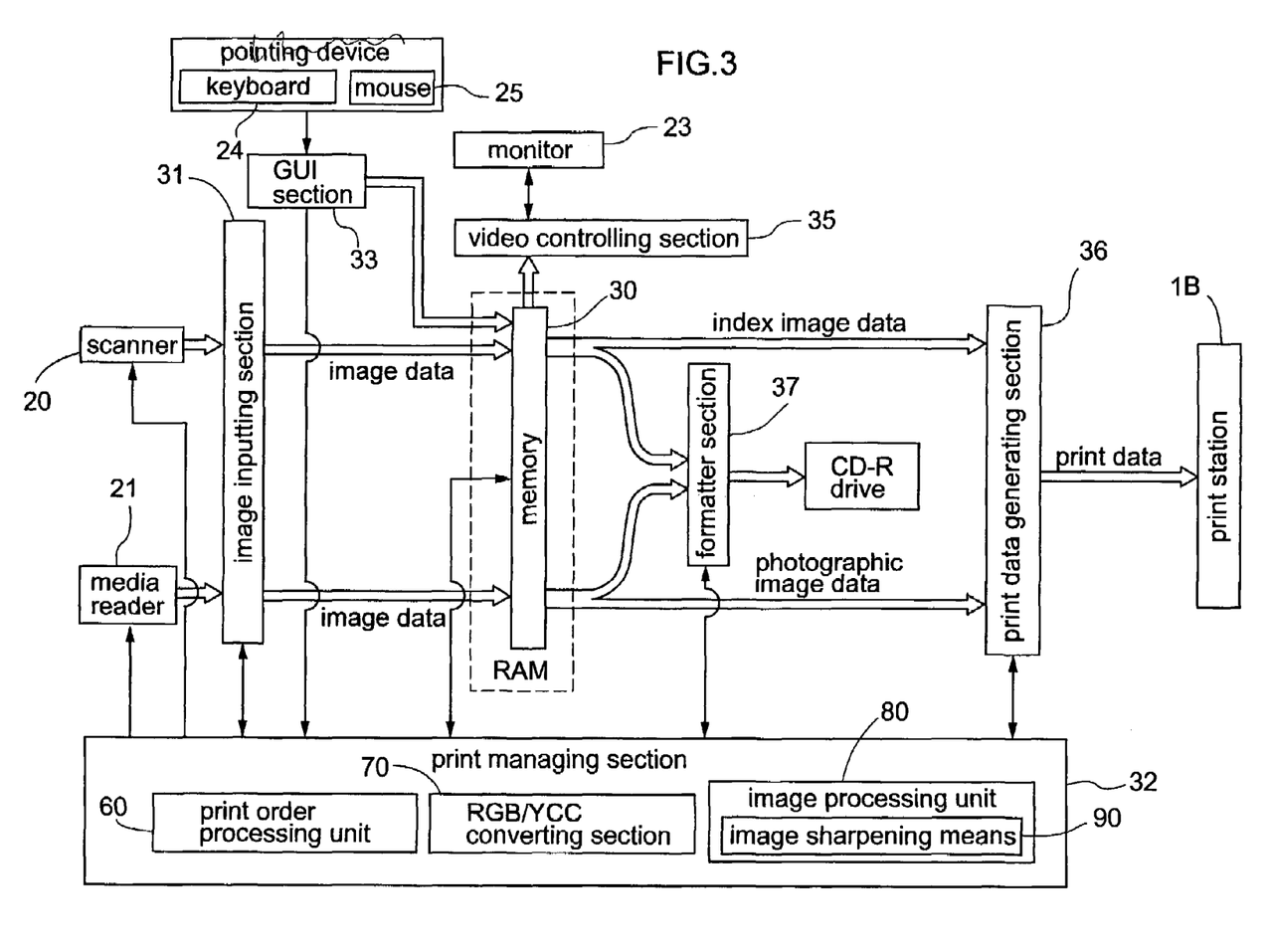
FIG. 3 is a functional block diagram for illustrating functional blocks or sections provided in a controller of the photographic printing system.

The controller 3 for the photographic printing system includes a CPU as a core component thereof and includes also various functional blocks or sections for effecting various operations of the photographic printing system realized in the form of hardware and/or software. Of these functional sections, as shown in FIG. 3, the following sections are of particular relevance to the present invention. An image inputting section 31 is provided for inputting the image data read by the scanner 20 or the media reader 21 and effecting any preparatory operation needed for a subsequent process. A GUI section 33 constitutes a graphic user interface (i.e. GUI) configured for creating a graphically assisted operation screen having various windows, various operation buttons or the like and generating control commands from user's operation inputs (via the keyboard 24, the mouse 25 or the like) effected through such graphic operation screen. A print managing section 32 effects e.g. an image processing operation on the image data transmitted from the image inputting section 31 to a memory 30 in order to generate desired print data according to a control command sent from the GUI section 33 or an operation command directly inputted via e.g. the keyboard 24. A video controlling section 35 generates video signals for causing the monitor 23 to display a print source image or a simulated image as an expected finished print image during a pre-judge printing operation for e.g. color correction and to display also the graphic data sent from the GUI section 33. A print data generating section 36 generates print data suited for the print exposing unit 14 mounted in the print station 1B, based on final image data whose image processing has been completed. A formatter section 37 formats raw image data or the finally processed image data into a format writable in e.g. a CD-R, in accordance with a customer's request.

Referring more particularly to the image inputting section 31, in case the photographic image recording media is a film 2a, this image inputting section 31 transmits scanned data scanned in a pre-scanning mode and a main scanning mode, separately to the memory 30, to effect a preparatory operation suited for each particular purpose. Whereas, in case the photographic image recording media is a memory card 2b, if the inputted image data contains thumbnail image data (low resolution data), the section 31 transmits this thumbnail data to the memory 30 separately from the main data (high resolution data) of the photographic image, so that the thumbnail data may be used for e.g. list (summary) display on the monitor 23. On the other hand, if no thumbnail data are contained therein, the image inputting section 31 creates reduced images from the main data and sent these as thumbnail data to the memory 30.

The print managing section 32 includes a print order processing unit 60 for managing the print size, the number of prints, etc., an RGB/YCC converting section 70 for effecting, on the image data mapped in the memory 30, a forward conversion from RGB color space to YCC color space or a reverse conversion from the latter to the former, and an image processing unit 80 for effecting e.g. a retouching operation on the same image data mapped in the memory 30.

Figure 4:
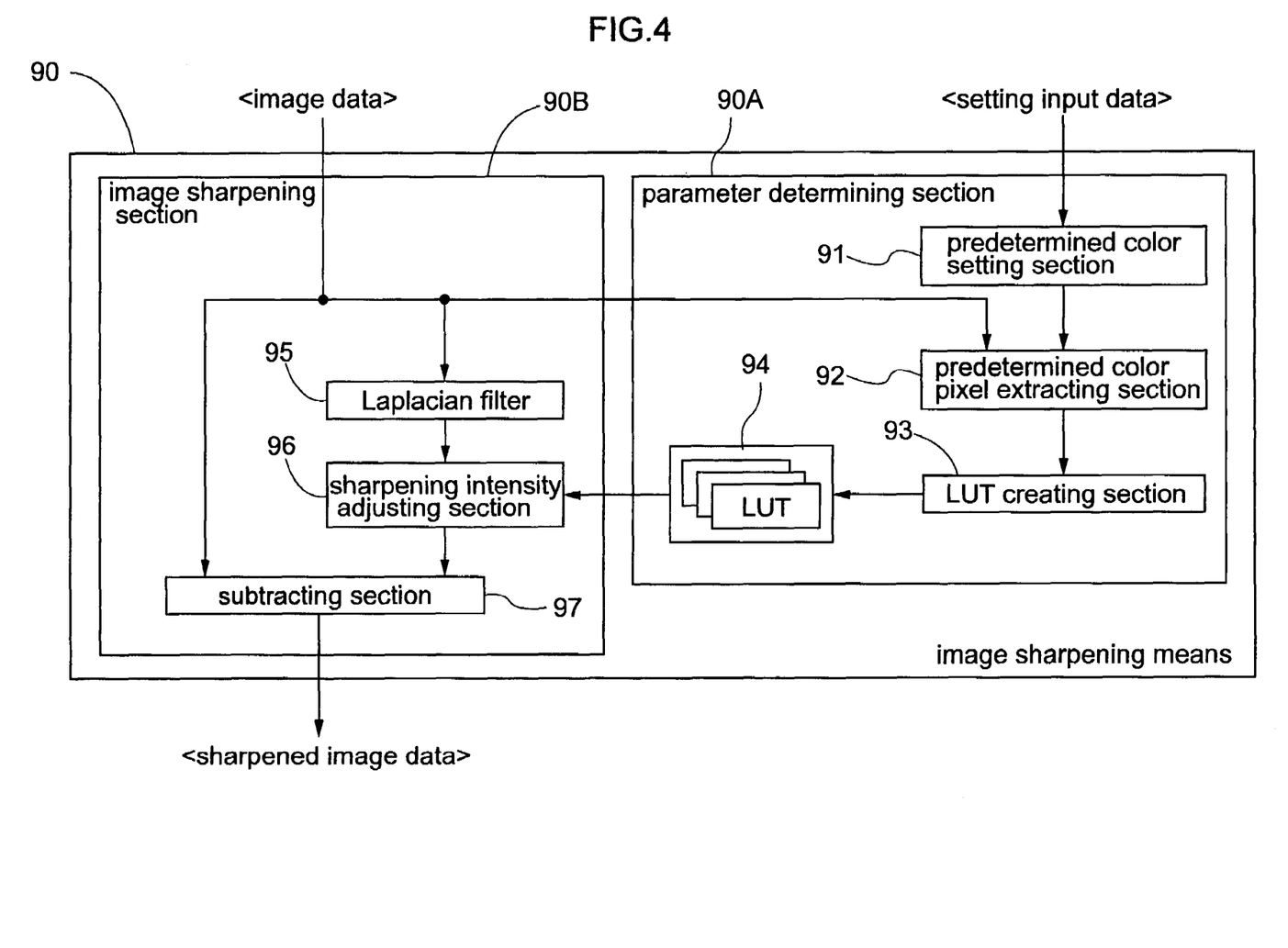
FIG. 4 is a block diagram showing functional blocks of an image sharpening means.

This image processing unit 80 includes an image sharpening means 90 employing the above-described technique according to the present invention. More particularly, this image sharpening means 90, as shown in FIG. 4, includes, as discrete functional blocks thereof, a parameter determining section 90A for determining a sharpening intensity adjustment parameter and a sharpening operation section 90B for effecting a pixel-by-pixel sharpening operation on the photographic image data while adjusting a sharpening intensity according to the determined sharpening intensity adjustment parameter. The parameter determining section 90A includes a predetermined color setting section 91 for presetting condition for specifying a predetermined color for use in discriminating between a pixel which should be subjected to a sharpening operation of a lessened intensity and a pixel which should be subjected to no sharpening operation at all, a predetermined pixel extracting section 92 for extracting, from the image data, a predetermined color pixel showing the predetermined color, and an LUT creating section 93 configured for calculating a sharpening intensity adjustment parameter for decreasing a sharpening intensity used in the sharpening operation section 90B for the extracted predetermined color pixel and then writing it in a lookup table ("LUT" hereinafter) 94. The sharpening operation section 90B includes a Laplacian filter 95 for effecting a Laplacian operation on the photographic image data, a sharpening intensity adjusting section 96 for adjusting an output value of the Laplacian filter 95 according to the sharpening intensity adjustment parameter retrieved from the LUT 94 for each pixel, and a subtracting section 97 for subtracting the adjusted output value adjusted by the sharpening intensity adjusting section 96 from a pixel value of the original image data.

Next, there will be described an image sharpening process effected by the image sharpening means 90 having the above-described construction. This process can be divided between an image sharpening intensity adjustment parameter determining routine and an image sharpening operation routine.

Figure 5:
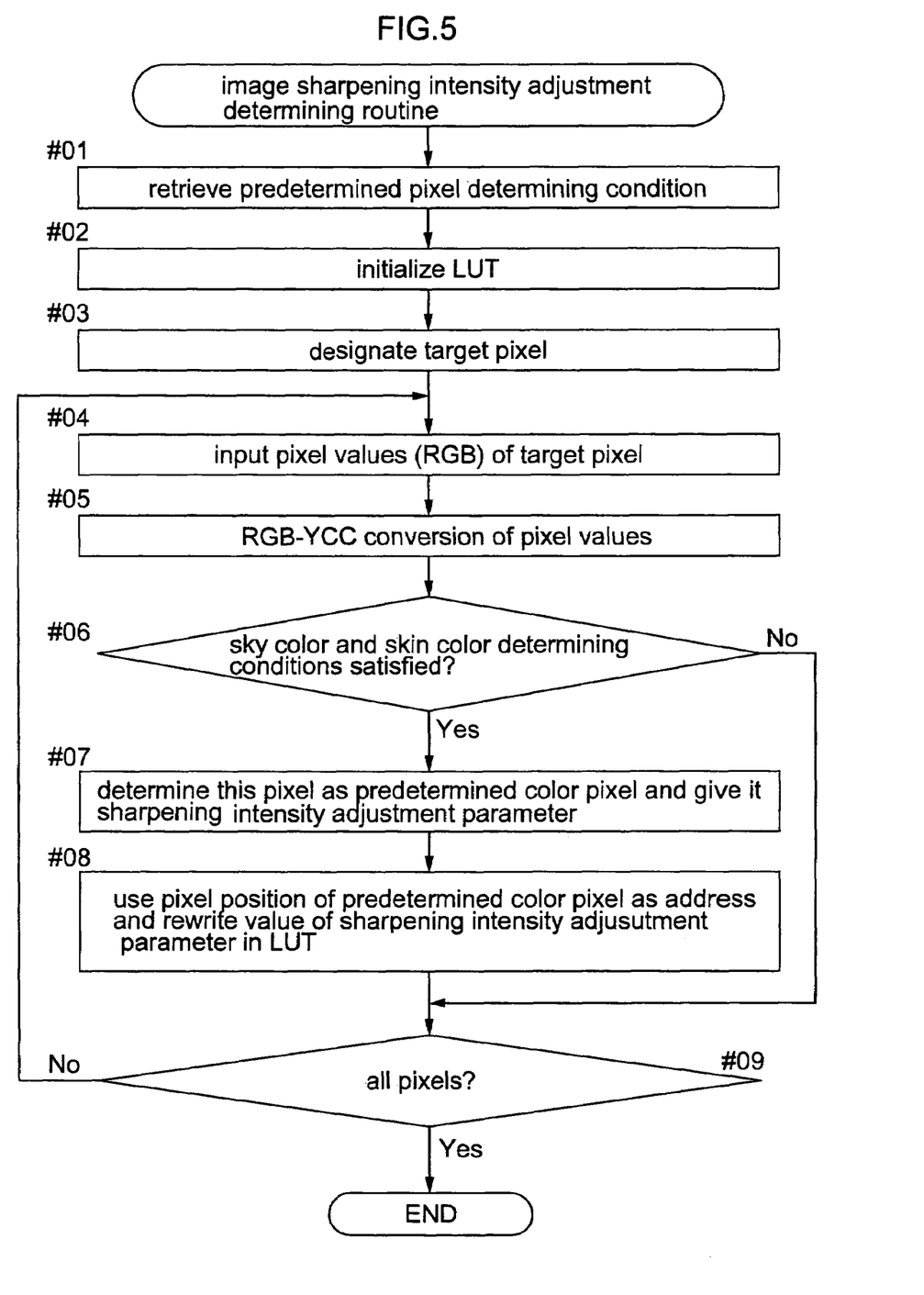
FIG. 5 is a flowchart illustrating an image sharpening intensity adjustment parameter determining routine.

Referring first to the image sharpening intensity adjustment parameter determining routine shown in the flowchart of FIG. 5, first, the process retrieves the predetermined color determining condition set at the predetermined color setting section 91 (#01) and then initializes the LUT 94 storing sharpening intensity adjustment parameters (#02). This initialization is generally done to set all of the value of the sharpening intensity adjustment parameters to "1" which means no adjustment of sharpening intensity. However, if necessary or appropriate, the initialization can employ a value near "1". Thereafter, as often effected in a filtering operation, the process designates target pixels one after another from the image data mapped in the memory 30 (#03) and then inputs pixel values (RGB space values) of each designated target pixel (#04). In the instant embodiment, the predetermined color determining condition comprises pixel values expressed in the YCC space. Therefore, the process inputs YCC space values which were converted by the RGB/YCC converting section 70 from the inputted RGB space values (#05). Incidentally, the conversion formula used by the RGB/YCC converting section 70 for the RGB-YCC conversion is as follows.

$$\begin{bmatrix} Y \\ C_1 \\ C_2 \end{bmatrix} = \begin{bmatrix} 0.333 & 0.333 & 0.334 \\ -0.166 & 0.50 & -0.334 \\ 0.50 & -0.334 & -0.166 \end{bmatrix} \begin{bmatrix} R \\ G \\ B \end{bmatrix} \quad \text{[formula 7]}$$

Then, the process checks whether the inputted YCC space values satisfy the determining conditions for the sky color and the human skin color as the predetermined colors or not (#06). Specifically, the skin color determining condition employed in this embodiment comprises a cylindrical inner area in the YCC space defined as:

$$C_1^2 + (C_2 - 25)^2 < 15^2 \quad \text{[formula 8]}$$

and the sky color determining condition employed in this embodiment comprises a cylindrical inner area in the YCC space defined as:

$$C_1^2 + (C_2 + 15)^2 < 15^2 \quad [9]$$

If the skin color or sky color determining condition is met (YES branched at #06), then, the process determines this target pixel as a predetermined color (human skin or sky color) pixel and gives a predetermined sharpening intensity adjustment parameter thereto (#07). In practice, the value of this sharpening intensity adjustment parameter can be a same value of e.g. "0.2" for both the skin color pixel and the sky color pixel. Or, different values such as "0.3" for a skin color pixel and "0.1" for a sky color pixel, may be employed. Then, the process accesses the LUT 94 with reference to the pixel position of this predetermined color pixel as an address thereof, to rewrite the value of the sharpening intensity adjustment parameter therein (#08). Lastly, the process checks whether or not the above-described operations from step #04 through step #08 have been completed for all the pixels constituting the image data mapped in the memory 30 (#09). With the above routine, for each pixel showing a predetermined color, there is created the LUT 94 storing the sharpening intensity adjustment parameter indicative of whether this particular pixel, compared with the other pixels, should be subjected to a sharpening operation of a lessened intensity or should be subjected to no sharpening operation at all.

Figure 6:
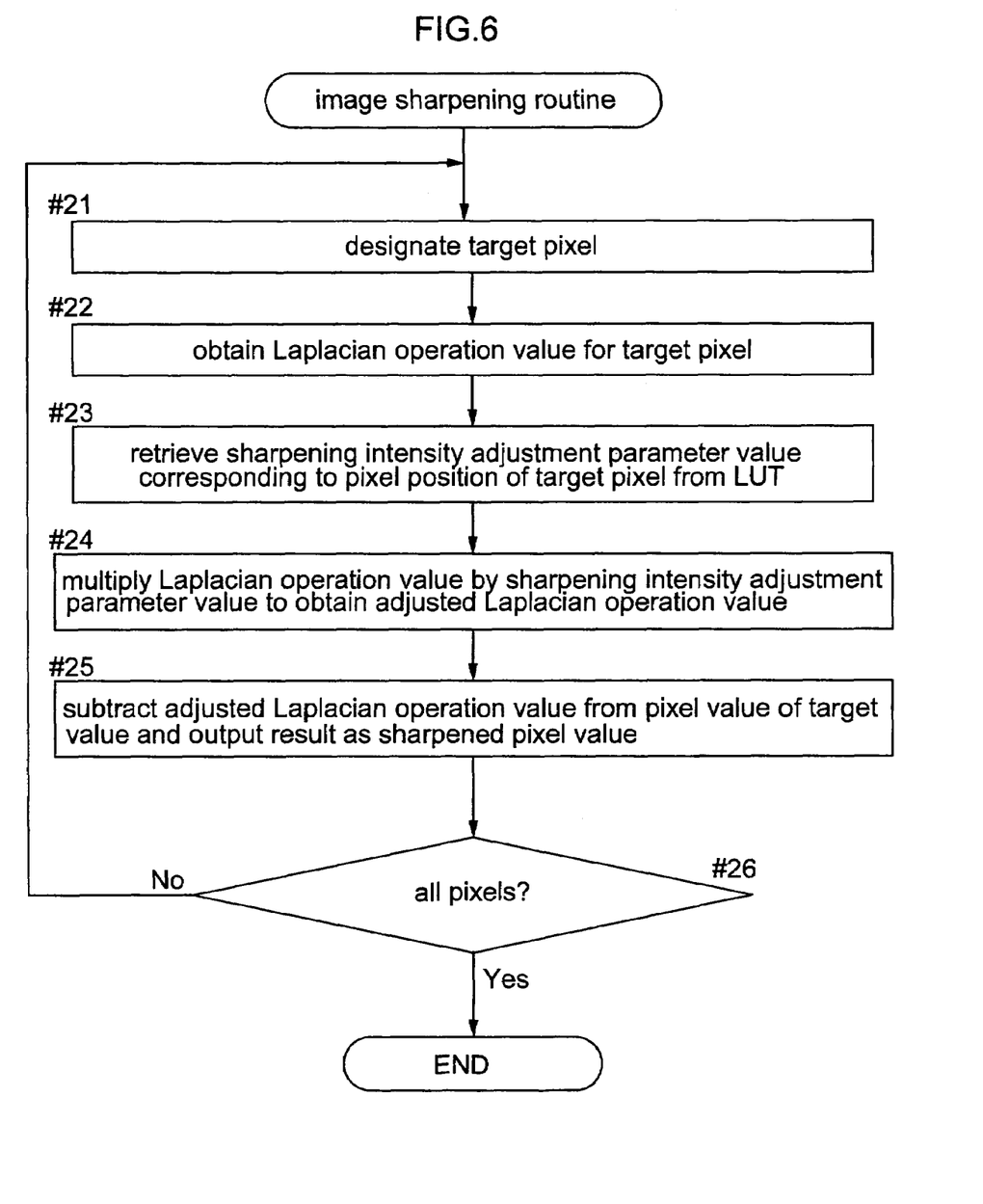
FIG. 6 is a flowchart illustrating an image sharpening operation routine.

The image sharpening operation routine using the sharpening intensity adjustment parameter stored in the LUT 94 is illustrated in the flowchart of FIG. 6. In this, first, the process designates target pixels one after another from the image data mapped in the memory 30 (#21). Then, for each designated target pixel, a Laplacian operation value is calculated by the Laplacian filter 95 (#22). According to the function of the sharpening intensity adjusting section 96, a sharpening intensity adjustment parameter corresponding to the pixel position of this target pixel is retrieved from the LUT 94 (#23) and the Laplacian operation value obtained in advance is multiplied by this sharpening intensity adjustment value, thus obtaining an adjusted Laplacian operation value (#24). Further, this adjusted Laplacian operation value is subtracted from the pixel value of the target pixel and the result is outputted as a final sharpened pixel value from the sharpening operation section 90B (#25). Lastly, the process checks whether or not the above-described operations from step #21 through step #25 have been completed for all the pixels constituting the image data mapped in the memory 30 (#26). Upon completion of the routine, the sharpening operation on the image data mapped in the memory 30 is completed, whereby there are obtained image data which have been sharpened except for the skin color and sky color areas or which have been sharpened with lessened intensity only in the skin color and sky color areas thereof.

Figure 7:
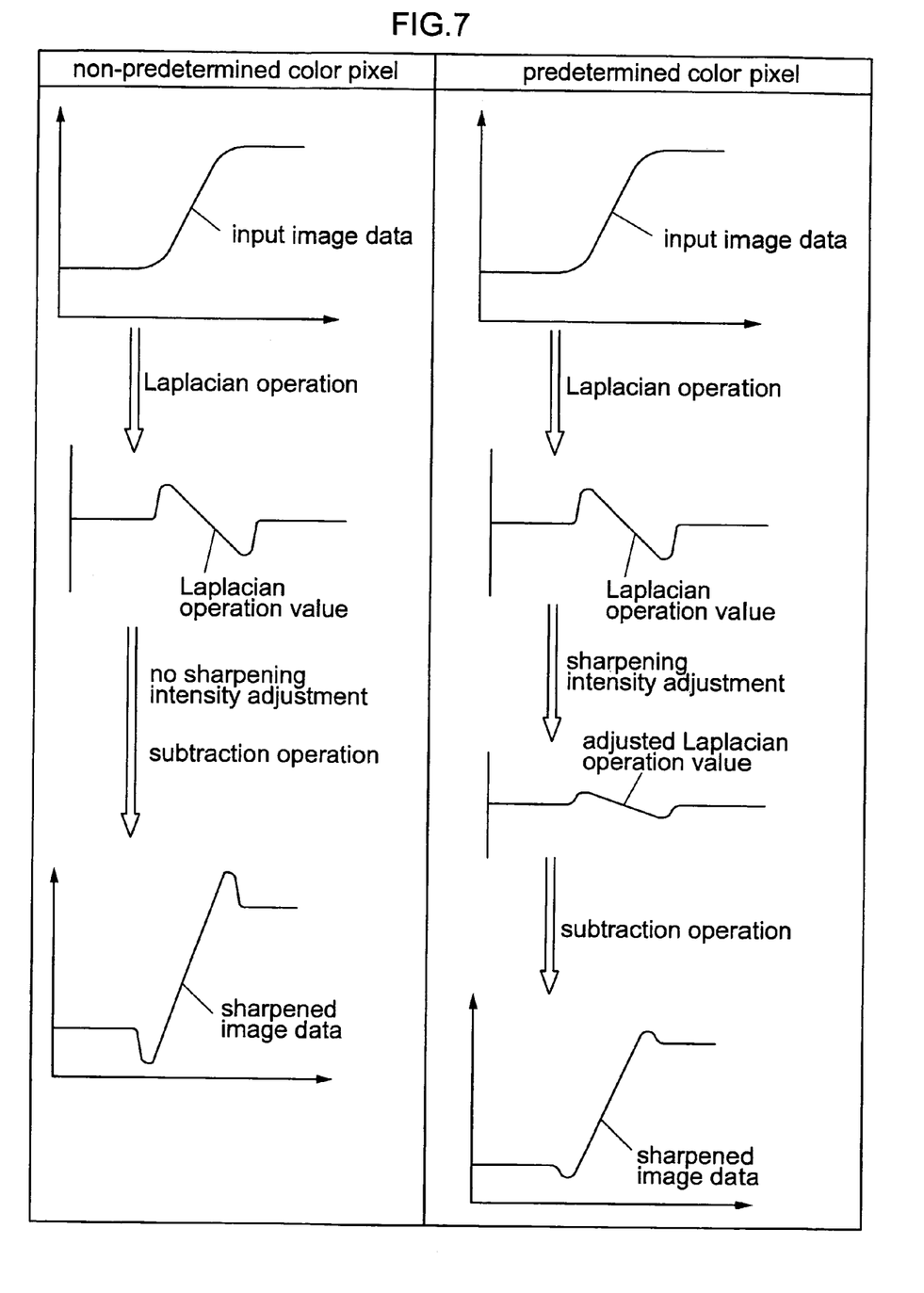
FIG. 7 is a diagram for explaining difference of image sharpening operation between a non-predetermined color pixel area and a predetermined color pixel area.

FIG. 7 schematically illustrates the above-described process from step #21 through step #25. As can be easily understood from this figure, a non-predetermined color pixel is subjected to an image sharpening operation such as the sharpening operation using the conventional Laplacian filter, whereas a predetermined color pixel is subjected to an image sharpening operation with positively reduced (or even zero) Laplacian operation value by the function of the sharpening intensity adjustment parameter, so that its image sharpening effect is very weak (or non-existent at all). Consequently, in a photographic image obtained based on the resultant sharpened image data, no noise enhancement is present in the photographically important area of sky, skin color, etc.

In the above-described sharpening intensity adjustment parameter determining routine, each single pixel is determined as a target pixel and then a sharpening intensity adjustment parameter therefor is determined. Instead of this, it is also possible to give or assign a sharpening intensity adjustment parameter to a unit block of pixels consisting of e.g. 10×10 pixels. And, in doing so, when even a single predetermined color pixel is found in the pixel block, a sharpening intensity reducing parameter can be given to that pixel block. Alternatively, the value of the sharpening intensity adjustment parameter can be changed according to a ratio of predetermined color pixels present among the pixels constituting the pixel block.

Figure 8:
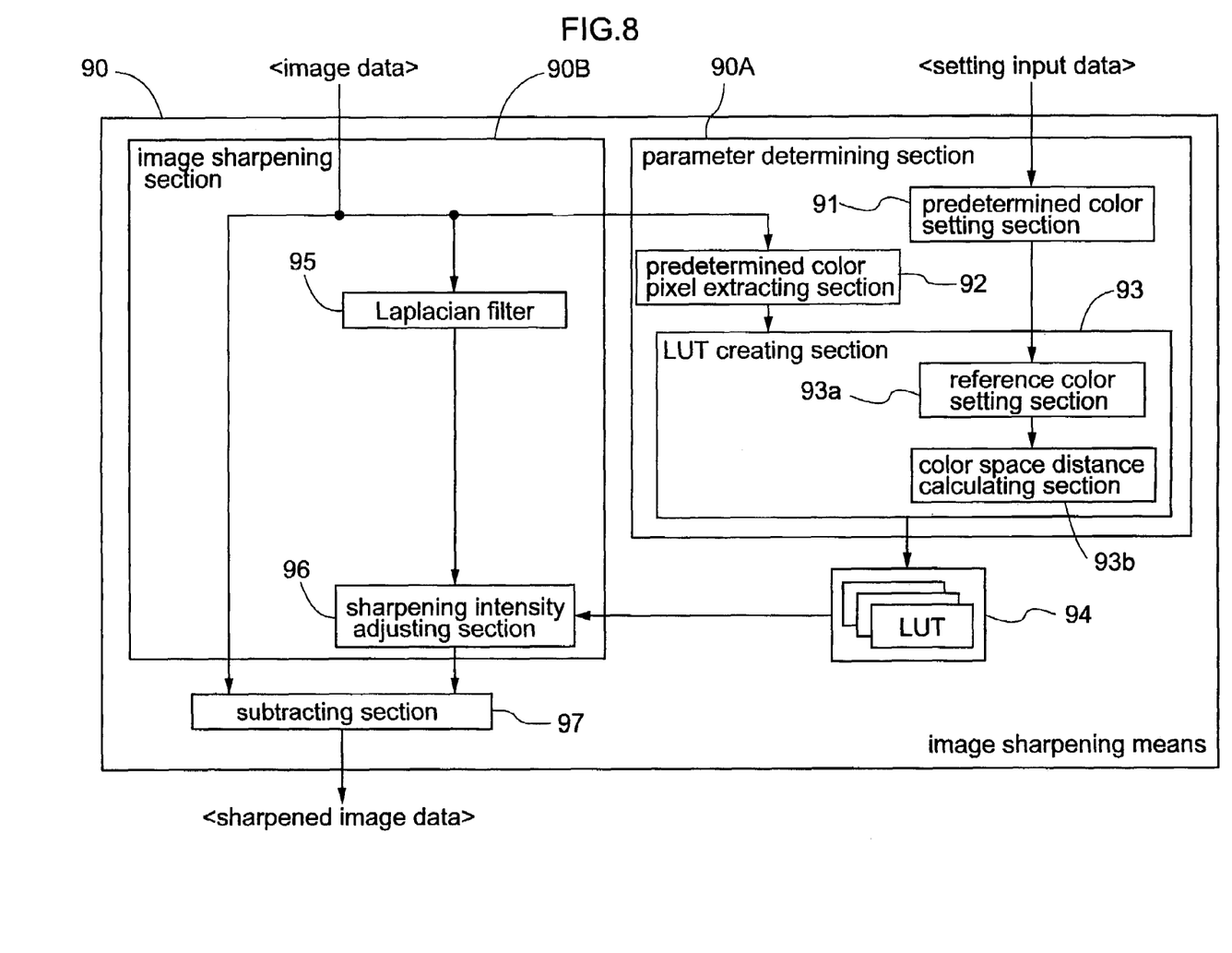
FIG. 8 is a functional block diagram for illustrating functional blocks of an LUT creating section relating to a further embodiment of the invention.

In the foregoing embodiment, in the determination of the sharpening intensity adjustment parameter, a common value of sharpening intensity adjustment parameter is given to all pixels which satisfy the predetermined color determining condition. Instead of this, the sharpening intensity adjustment parameter can be determined, depending on a color space distance from each pixel from a reference color pixel representative of the predetermined color. The "color space distance" as used herein refers to a "distance" from the reference color in the respect of hue, chroma, or luminance, or any combination thereof. For instance, assuming each pixel has a hue H, a luminance S and a chroma S and the reference color has a hue H0, a luminance L0 and a chroma S0, the color space distance: X therebetween can be obtained as a function: F of ΔH=H−H0, ΔL=L−L0 and ΔS=S−S0, i.e. X=F (ΔH, ΔL, ΔS). And, the process can employ only at least one of ΔH, ΔL, ΔS. This function: F (ΔH, ΔL, ΔS) can be obtained empirically and/or experimentally. Further, if the sharpening intensity adjustment parameter is determined by using a predetermined function G or table, in accordance with the color space distance: X calculated in the manner described above, this will result in greater smoothness in the transition of the sharpening intensity adjustment parameter between the non-predetermined color pixel area and the predetermined color pixel area. As a result, sharpened image data of even higher quality can be obtained. An example of the LUT creating section 93 for realizing such modified sharpening intensity adjustment parameter determination is shown in FIG. 8. In this, the LUT creating section 93 includes a reference pixel setting section 93a for setting a reference color having a hue H0, a luminance L0 and a chroma S0 from the predetermined color and a color space distance calculating section 93b having a function or table for obtaining a sharpening intensity adjustment parameter from the color space distance: X Further, in the foregoing embodiment, the sharpening intensity adjustment parameter determining routine is provided independently of the sharpening operation routine. Instead of this, it is also possible to carry out the sharpening intensity adjustment parameter determining routine in the processing of each target pixel in the image sharpening operation routine. In this case, the LUT 94 can be omitted. Further, in the determination of the sharpening intensity adjustment parameter, the process may employ a modified table which allows retrieval of a sharpening intensity adjustment parameter therefrom by using the pixel value of the target pixel as an "argument"

In the foregoing, the sharpening operation section 90B employs the Laplacian filter 95 as the sharpening filter. Instead of this, the sharpening operation section 90B can comprise any other type of filter well-known in the art of image processing. Hence, the present invention is not limited to the use of the Laplacian filter 95. Moreover, the sharpening intensity adjustment parameter according to the invention may be incorporated in the sharpening technique disclosed by Document 1.

In the foregoing embodiment, there is employed the so-called silver salt photographic printing technique wherein the print station 1B effects exposure of the print paper P with a photographic image at the print exposing unit 14 having the exposure engine and then develops a plurality of developing operations of this exposed print paper P. Needless to say, in this invention, the print station 1B is not limited to such type. Instead, various photographic printing systems such as an ink jet printing for forming an image by jetting ink on to a film or a paper, a heat transfer printing method using a heat-sensitive sheet, etc. can be employed.

The invention claimed is:

1. An image processing method for sharpening photographic image data obtained through digitization of a photographic image by using a sharpening filter capable of sharpening intensity adjustment, the method comprising the steps of:
extracting from the photographic image data a predetermined color pixel showing a predetermined color;
giving a sharpening intensity adjustment parameter to the predetermined color pixel;
adjusting a sharpening intensity of the sharpening filter for predetermined color pixel according to the sharpening intensity adjustment parameter; and
effecting a pixel-by-pixel operation on the photographic image data using the adjusted sharpening filter for the predetermined color pixel and the sharpening filter for the remaining color pixel in the photographic image data.

2. The image processing method according to claim 1, wherein the sharpening filter comprises a Laplacian filter whose output is adjusted according to the sharpening intensity adjustment parameter, and a value of the adjusted output is subtracted from a pixel value of the predetermined color pixel.

3. The image processing method according to claim 1, wherein the sharpening intensity adjustment parameter is tabulated in the form of a lookup table in correlation with the position of the pixel as an address.

4. The image processing method according to claim 1, wherein the sharpening intensity adjustment parameter is determined, depending on a color space distance from a reference color representing The predetermined color.

5. The image processing method according to claim 1, wherein the predetermined color comprises the human skin color and the sky color.

6. The image processing method according to claim 1, wherein at the pixel extracting step for extracting the predetermined color pixel, the 1 photographic image data expressed in the RGB color space are converted into the YCC space according to the following formula:

$$\begin{bmatrix} Y \\ C_1 \\ C_2 \end{bmatrix} = \begin{bmatrix} 0.333 & 0.333 & 0.334 \\ -0.166 & 0.50 & -0.334 \\ 0.50 & -0.334 & -0.166 \end{bmatrix} \begin{bmatrix} R \\ G \\ B \end{bmatrix} \quad \text{[formula 1]}$$

where, the determination condition for the human skin color in this YCC space is:

$$C_1^2 + (C_2 - 25)^2 < 15^2 \quad \text{[formula 2]}$$

and the determination condition for the sky color is:

$$C_1^2 + (C_2 + 15)^2 < 15^2 \quad \text{[formula 3]}.$$

7. A computer-readable medium comprising computer-executable instructions for sharpening photographic image data obtained through digitization of a photographic image by using a sharpening filter capable of sharpening intensity adjustment, said instructions comprising instructions for:
extracting from the photographic image data a predetermined color pixel showing a predetermined color;
giving a sharpening intensity adjustment parameter to the predetermined color pixel;
adjusting a sharpening intensity of the sharpening filter for predetermined color pixel according to the sharpening intensity adjustment parameter; and
effecting a pixel-by-pixel operation on the photographic image data using the adjusted sharpening filter for the predetermined color pixel and the sharpening filter for the remaining color pixel in the photographic image data.

8. An image processing apparatus for sharpening photographic image data obtained through digitization of a photographic image by using a sharpening filter capable of sharpening intensity adjustment, the apparatus comprising:
a parameter determining section for extracting from the photographic image data a predetermined color pixel showing a predetermined color and then giving a sharpening intensity adjustment parameter to the predetermined color pixel; and a sharpening operation section for adjusting a sharpening intensity of the sharpening filter for predetermined color pixel according to the sharpening intensity adjustment parameter, and effecting a pixel-by-pixel sharpening operation on the photographic image data using the adjusted sharpening filter for the predetermined color pixel and the sharpening filter for the remaining color pixel in the photographic image data.

9. The image processing apparatus according to claim 8, wherein the sharpening operation section includes a Laplacian filter for effecting a Laplacian operation on the photographic image data, a sharpening intensity adjusting section for adjusting an output value of the Laplacian filter according to the sharpening intensity adjustment parameter, and a subtracting section for subtracting a value of the adjusted output from a pixel value of the predetermined color pixel.

10. An image processing method for sharpening photographic image data obtained through digitization of photographic image by using a sharpening filter capable of sharpening intensity adjustment the method comprising the steps of:

extracting from the photographic image data a predetermined color pixel showing a predetermined color;

dividing the photographic image data into a plurality of unit blocks of a predetermined block size and giving a sharpening intensity adjustment parameter to the predetermined color pixel according to a ratio of predetermined color pixels present among the pixels constituting the pixel blocks; and effecting a pixel-by-pixel sharpening operation on the photographic image data while adjusting a sharpening intensity of the sharpening filter according to the sharpening intensity adjustment parameter.

\* \* \* \* \*